US007091822B2

(12) United States Patent
Flick et al.

(10) Patent No.: US 7,091,822 B2
(45) Date of Patent: Aug. 15, 2006

(54) VEHICLE REMOTE START CONTROL SYSTEM INCLUDING A TRANSPONDER CODE BYPASS TRANSMITTER AND ASSOCIATED METHODS

(75) Inventors: Kenneth E. Flick, Douglasville, GA (US); Michael Stephen Thompson, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 261 days.

(21) Appl. No.: 10/452,843

(22) Filed: Jun. 2, 2003

(65) Prior Publication Data

US 2004/0239483 A1 Dec. 2, 2004

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl. .................... 340/5.72; 340/5.74; 340/5.8; 340/5.2

(58) Field of Classification Search ............... 340/5.72, 340/5.7, 5.74, 5.8, 5.81, 5.51, 5.54, 5.6, 5.61, 340/5.62, 426; 455/569.2, 11.1; 307/10.2
See application file for complete search history.

(56) References Cited

U.S. PATENT DOCUMENTS

| | | | | |
|---|---|---|---|---|
| 4,383,242 A | 5/1983 | Sassover et al. | 340/64 |
| 5,146,215 A | 9/1992 | Drori | 340/825 |
| 5,252,966 A | 10/1993 | Lambropoulos et al. | 340/825 |
| 5,635,900 A * | 6/1997 | Hasegawa et al. | 340/5.25 |
| 5,719,551 A | 2/1998 | Flick | 340/426 |
| 5,751,073 A | 5/1998 | Ross | 307/10.5 |
| 5,798,576 A * | 8/1998 | Ostermann et al. | 340/825.69 |
| 5,815,108 A * | 9/1998 | Terk | 341/176 |
| 5,869,908 A | 2/1999 | Moczygemba et al. | 307/10.5 |
| 5,897,598 A | 4/1999 | Puetz | 701/35 |
| 5,905,444 A | 5/1999 | Zimmer | 340/825 |
| 5,912,512 A | 6/1999 | Hayashi et al. | 307/10.5 |
| 6,011,460 A * | 1/2000 | Flick | 340/426.25 |
| 6,188,326 B1 * | 2/2001 | Flick | 340/825.69 |
| 6,429,768 B1 | 8/2002 | Flick | 340/5.2 |
| 6,617,975 B1 * | 9/2003 | Burgess | 340/815.47 |
| 6,700,220 B1 * | 3/2004 | Bayeur et al. | 307/10.2 |
| 6,853,853 B1 * | 2/2005 | Van Wiemeersch et al. | 455/569.2 |
| 2001/0000957 A1 | 5/2001 | Birchfield et al. | 340/5.62 |
| 2003/0095030 A1 | 5/2003 | Greenwood | 340/5.61 |

FOREIGN PATENT DOCUMENTS

| | | |
|---|---|---|
| EP | 1 095 827 | 2/2001 |

* cited by examiner

*Primary Examiner*—Wendy R. Garber
*Assistant Examiner*—Nam Nguyen
(74) *Attorney, Agent, or Firm*—Allen, Dyer, Doppelt, Milbrath & Gilchrist, P.A.

(57) ABSTRACT

A vehicle remote start control system is for a vehicle including a vehicle engine, an electrical system, and a transponder reader. The transponder reader may enable the vehicle engine based upon wirelessly reading an authorized code from a transponder carried by a user and placed proximate the transponder reader. The system may include a remote start transmitter and a remote start controller at the vehicle. The remote start controller may include a transponder code bypass transmitter electrically connected to the vehicle electrical system for wirelessly transmitting the authorized code to the transponder reader responsive to the remote start transmitter to enable the vehicle engine.

43 Claims, 4 Drawing Sheets

VEHICLE REMOTE START CONTROL SYSTEM INCLUDING A TRANSPONDER CODE BYPASS TRANSMITTER AND ASSOCIATED METHODS

FIELD OF THE INVENTION

The present invention relates to the field of vehicle systems and, more particularly, to the field of vehicle control systems, and associated methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

A relatively new development in the field of vehicle security relates to a transponder to be carried by the vehicle user, such as on a key ring. The transponder is uniquely coded to transmit a transponder radio signal to a transponder reader at the vehicle. Until the transponder reader receives the uniquely coded transponder radio signal, certain vehicle functions may not operate, such as vehicle starting, for example. The reader may include a transmitter for temporarily charging a capacitor in the transponder so that the transponder can then transmit its unique code. The transponder requires no batteries, is relatively small, and can be sealed to avoid damage from moisture. One such transponder is disclosed in U.S. Pat. No. 5,869,908 to Moczygemba et al.

The transponder feature means that a would-be thief can no longer break the ignition switch housing to start the vehicle. Instead possession of the properly coded transponder is required or the vehicle will not start. Some variations of the transponder technology can eliminate the need for the traditional mechanical key altogether. A number of manufacturers offer such transponder and reader systems including Texas Instruments of Dallas, Tex. under the designation TIRIS. U.S. Pat. No. 5,905,444 to Zimmer and U.S. Pat. No. 5,897,598 to Puetz disclose further developments in the vehicle transponder security area.

Unfortunately, due to the increased security provided by a transponder and a corresponding transponder reader, installation of a vehicle engine remote start system may be more complicated. When remotely starting the vehicle engine, the transponder is not close enough to the transponder reader to transmit the desired transponder radio signal. Accordingly, in an effort to bypass the transponder reader, installers have removed the transponder from the vehicle key and fastened it adjacent the transponder reader. Therefore, the transponder reader continuously receives the desired transponder radio signal from the transponder, and does not immobilize the vehicle engine. This method of installation, however, may disadvantageously decrease security.

U.S. Published Patent Application No. 2001/0000957 by Birchfield et al. attempts to address this problem, and discloses a remote start, passive anti-theft system for a vehicle having a transponder and transponder reader. The system includes an extra transponder positioned adjacent the transponder reader. The extra transponder includes a shielding coil that shields the transponder signal transmitted by the extra transponder except for when remote starting of the vehicle is desired.

SUMMARY OF THE INVENTION

In view of the foregoing background, it is therefore an object of the present invention to provide a vehicle remote start control system and associated method which is readily adaptable to a vehicle having a transponder and transponder reader associated therewith.

This and other objects, features, and advantages of the present invention are provided by a vehicle remote start control system for providing a signal to bypass a transponder reader to enable a vehicle engine. More specifically, the remote start control system is preferably for use in a vehicle comprising a vehicle engine, an electrical system, and a transponder reader. The transponder reader may enable the vehicle engine based upon wirelessly reading an authorized code from a transponder carried by a user.

The remote start control system may comprise a remote start transmitter, and a remote start controller at the vehicle. The remote start controller may comprise a transponder code bypass transmitter electrically connected to the vehicle electrical system for wirelessly transmitting an authorized code to the transponder reader responsive to the remote start transmitter to enable the vehicle engine.

The transponder reader may comprise a transponder exciter for powering the transponder carried by the user; however, the transponder code bypass transmitter may advantageously operate from the vehicle electrical system. In other words, the transponder code bypass transmitter may operate independently of the transponder exciter. The remote start controller may turn off the transponder code bypass transmitter except when remote starting the vehicle engine. Accordingly, the security provided by the transponder reader and the transponder is not compromised.

The remote start controller may comprise a multi-vehicle remote start controller compatible with a plurality of different transponder signal formats. The remote start controller may be switchable to a learning mode for learning a desired transponder signal format from among a plurality of different transponder signal formats. The remote start controller may comprise a downloading interface for receiving the desired transponder signal format from among the plurality of different transponder signal formats when in the learning mode. A user operable switch may permit the user to input the desired transponder signal format from among the plurality of different transponder signal formats.

The remote start controller may also be switchable to a learning mode for learning an authorized code. While in the learning mode, the remote start controller may also learn a sequence of authorized codes for use with a changing code transponder reader. Alternately, or additionally, the remote start controller may comprise a downloading interface for receiving the authorized codes, and/or a user operable switch for user input of the at least one authorized code when in the learning mode.

The remote start controller may repeat the authorized code for at least one of a predetermined number of times, and a predetermined time duration to advantageously enhance security of the vehicle. The remote start controller may comprise a processor and a memory connected thereto.

The vehicle may comprise a data communications bus, and the remote start controller may comprise a data bus interface for interfacing with the vehicle data communications bus to advantageously allow vehicle data to be transferred to or from the remote start controller. The remote transmitter may comprise a handheld remote transmitter to be carried by a user, for example, or may comprise a central station transmitter.

A method aspect for the present invention is for remotely starting the vehicle engine. The method may comprise providing a remote start controller at the vehicle comprising a transponder code bypass transmitter electrically connected to the vehicle electrical system, and wirelessly transmitting an authorized code to the from the transponder code bypass transmitter to the transponder reader responsive to the remote start transmitter to enable the vehicle engine.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to line elements throughout.

Figure 1:
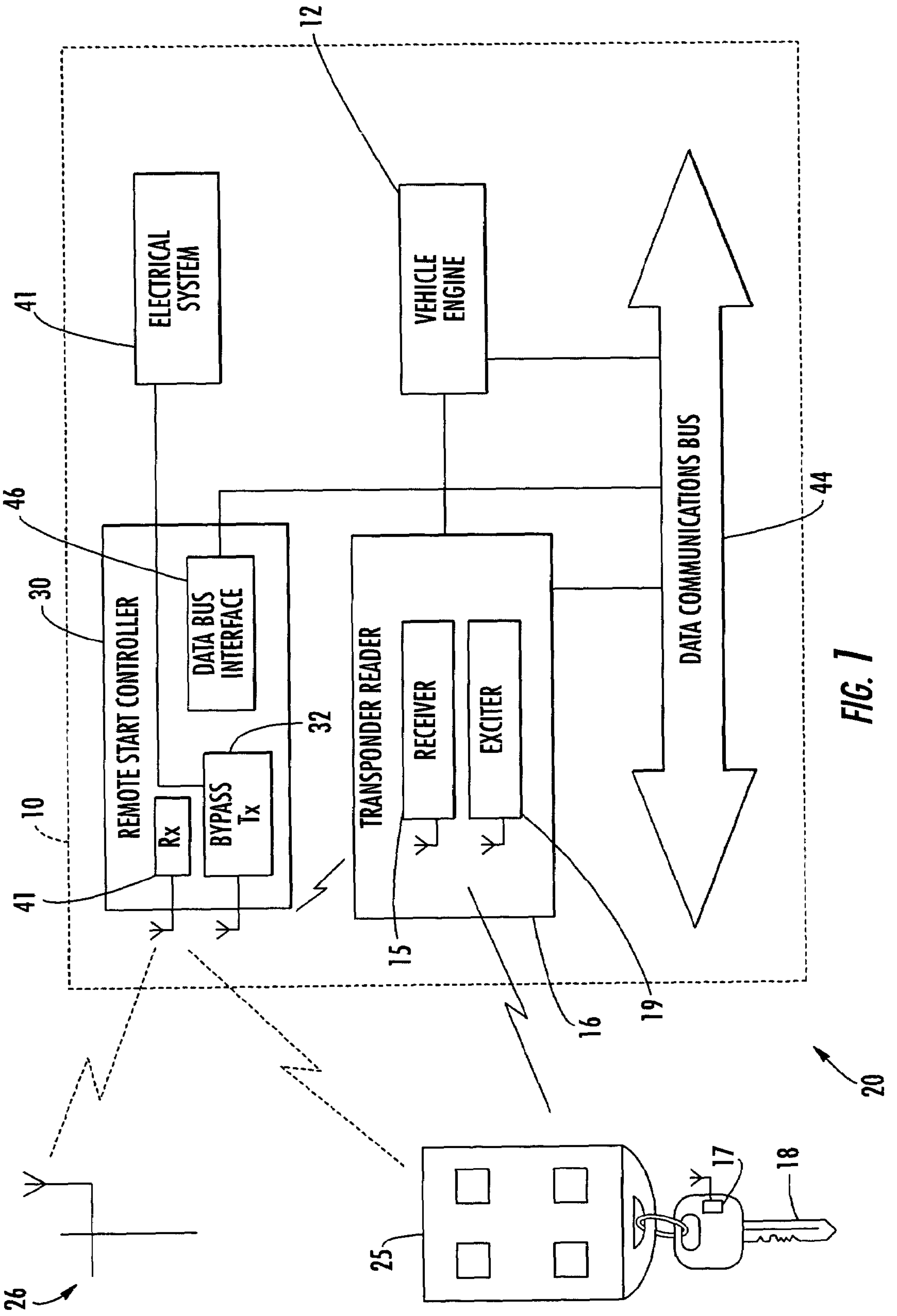
FIG. 1 is a schematic block diagram of a vehicle remote start control system according to the present invention.
Figure 2:
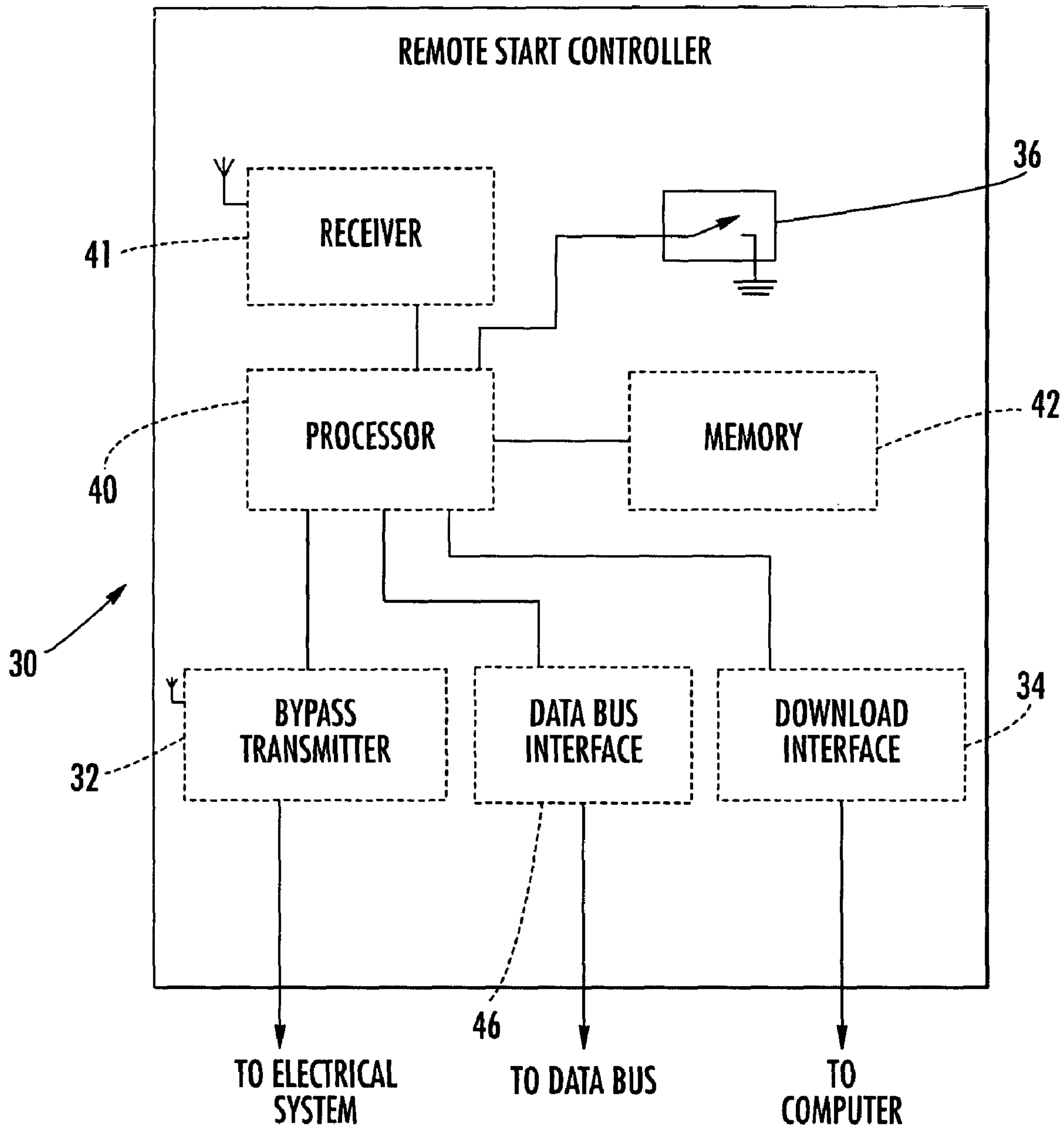
FIG. 2 is a more detailed schematic block diagram of the vehicle remote start controller illustrated in FIG. 1.

Referring initially to FIGS. 1 and 2, a vehicle remote start control system 20 is now described. The remote start control system 20 is for a vehicle 10 comprising a vehicle engine 12, an electrical system 14, and a transponder reader 16. The transponder reader 16 enables the vehicle engine 12 based upon wirelessly reading an authorized code from a transponder 17 carried by a user. Generally, the transponder 17 wirelessly transmits an authorized code to a receiver 15 of the transponder reader 16 when positioned within close proximity of the transponder reader. More detail on operation of the transponder is disclosed in commonly assigned U.S. Pat. No. 6,429,768 to Flick, the entire disclosure of which is incorporated herein by reference. The transponder 17 may illustratively be carried within a key 18 to be carried by the user, for example, but may also be carried separately.

The remote start control system 20 illustratively comprises a remote start transmitter 25, and a remote start controller 30 at the vehicle 10. The remote start controller 30 illustratively comprises a transponder code bypass transmitter 32 electrically connected to the vehicle electrical system 40. The transponder code bypass transmitter 32 wirelessly transmits an authorized code to the transponder reader 16 responsive to the remote start transmitter 25 to enable the vehicle engine 12. Accordingly, the transponder reader 16 may advantageously enable the vehicle engine 12 without the transponder 17 being within close proximity.

The transponder reader 16 illustratively comprises a transponder exciter 19 for powering the transponder 17 carried by the user. In other words, when the transponder 17 is within close proximity of the transponder reader 16, the exciter 19 transmits a signal to the transponder to thereby power the transponder to transmit the unique code.

The transponder code bypass transmitter 32, however, is illustratively connected to the vehicle electrical system 14. Therefore, the transponder code bypass transmitter 32 may advantageously operate independently of the transponder exciter 19.

The remote start controller 30 may turn off the transponder code bypass transmitter 32 except when remote starting the vehicle engine 12. This advantageously enhances security of the vehicle 12.

The remote start controller 30 may comprise a multi-vehicle remote start controller compatible with a plurality of different transponder signal formats. There exist different transponder signal formats for different transponder types. For example, the unique codes transmitted by transponders may have different numbers of bits. Further, modulation schemes, as well as the frequency of the modulation schemes, may vary between different transponder types.

The remote start controller 30 is switchable to a learning mode for learning a desired transponder signal format from among a plurality of different transponder signal formats. The remote start controller 30 may illustratively comprise a downloading interface 34 for receiving the desired transponder signal format. Alternately, or additionally, the remote start controller 30 may illustratively comprise at least one user operable switch 36 for user input of the desired transponder signal format.

The remote start controller 30 is also switchable to the learning mode for learning authorized codes. The remote start controller 30 may advantageously learn a sequence of authorized codes for use with a changing code transponder reader. The downloading interface 34 may be used to download the authorized codes. Alternately, or additionally, the user may use the user operable switch 36 to manually input the authorized codes.

The remote start controller 30 may repeat the authorized code for at least one of a predetermined number of times and a predetermined time duration so that the transponder reader 16 is sure to receive the transponder signal. Since the authorized code is transmitted selectively, the vehicle engine 12 is not continuously enabled, but rather only enabled when the transponder reader 16 receives the authorized code, thereby enhancing security.

The remote start controller 30 illustratively comprises a processor 40 and a memory 42 connected thereto. The memory 42, for example, may store a plurality of different transponder signal formats and the remote start controller 30 may choose a desired transponder signal format from among the plurality of different transponder signal formats. The remote start controller also illustratively comprises a receiver 41 for receiving the remote start signal from the remote start transmitter 25. The memory 42 advantageously allows for storage of multiple codes and modulation schemes, for example, so that the remote start controller 30 is compatible with a plurality of different transponder signal formats, and a plurality of different transponder types.

The vehicle further illustratively comprises a data communications bus 44. Many different vehicle signals associated with various vehicle functions may be transmitted along the data communications bus 44, such as, for example, data relating to window operation, door lock operation, engine operation, or any other vehicle function, as understood by those skilled in the art. The remote start controller 30 further illustratively comprises a data bus interface 46 for interfacing with the vehicle data communications bus 44. Accordingly, the remote start controller may read vehicle functions transmitted along the data communications bus 44 and/or send commands onto the data communications bus. In some embodiments, the vehicle 10 may not have a data communications bus 44, and/or the remote start controller 30 may be hardwired to parts of the vehicle. Accordingly, in such embodiments, the remote start controller 30 would also not include the data communications bus interface 46.

The remote transmitter illustrated in FIG. 1 is a handheld remote transmitter 25 to be carried by a user. The handheld remote transmitter 25 is advantageously small in size for easy transport by the user. The remote transmitter may optionally be a central station remote transmitter 26.

Figure 3:
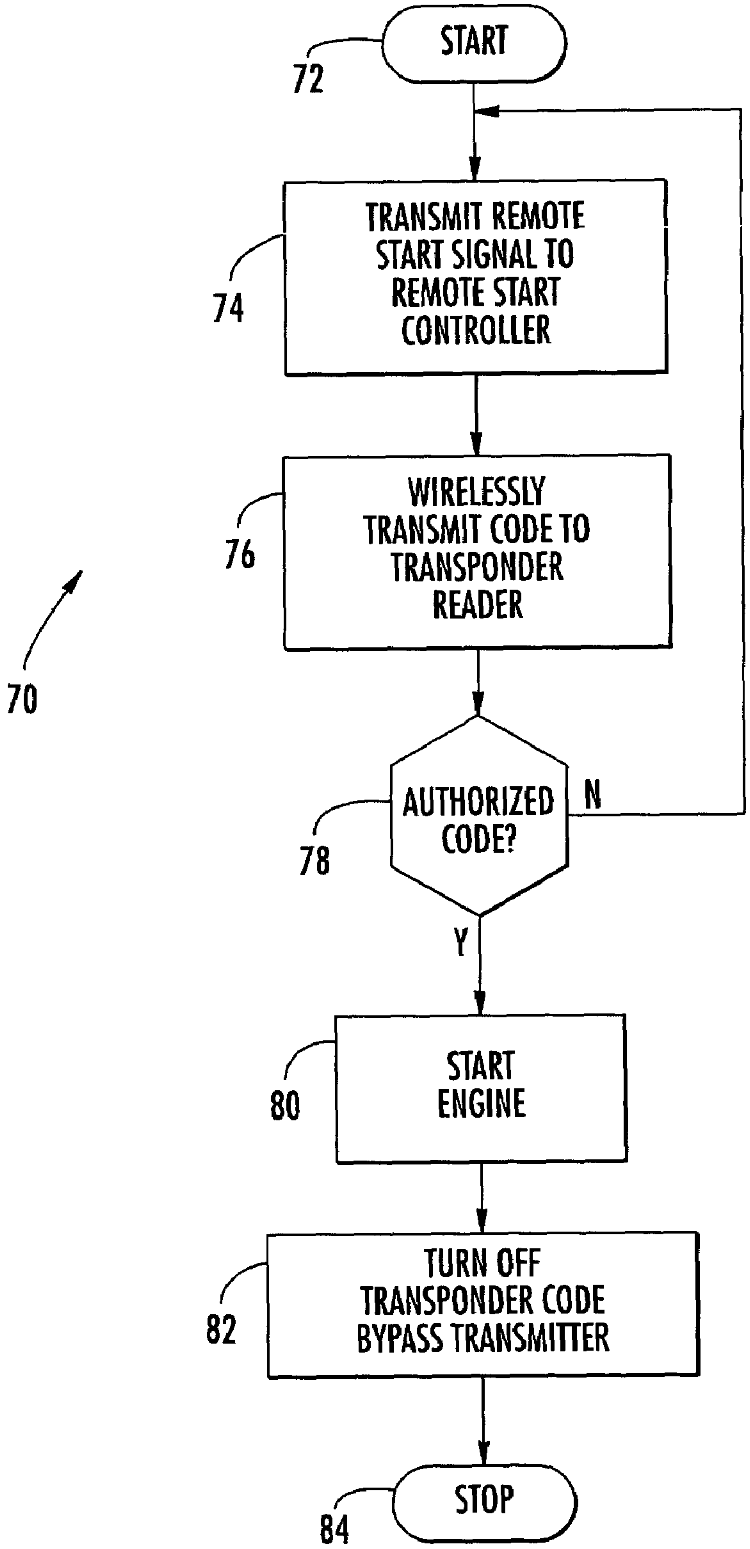
FIG. 3 is a flow chart illustrating operation of the vehicle remote start control system shown in FIG. 1.

Turning now additionally to the flow chart 60 of FIG. 3, a method of operating the vehicle remote start control system 20 is now described. From the start (Block 72) the remote start transmitter 25 transmits the remote start signal to the remote start controller 30 at Block 74. At Block 76, the remote start controller 30 wirelessly transmits a code to the transponder reader 16. As noted above, the remote start controller 30 may repeat the code for at least one of a predetermined number of times and a predetermined time duration.

At Block 78, it is determined whether the code is authorized. If it is determined that the code is not an authorized code, then the vehicle engine is not started, and the remote start controller 30 again awaits for receipt of the remote start signal. If, however, it is determined at Block 78 that the code is an authorized code, then, at Block 80, the vehicle engine 12 is started. At Block 82, the transponder code bypass transmitter 32 is turned off before completion at Block 86.

Figure 4:
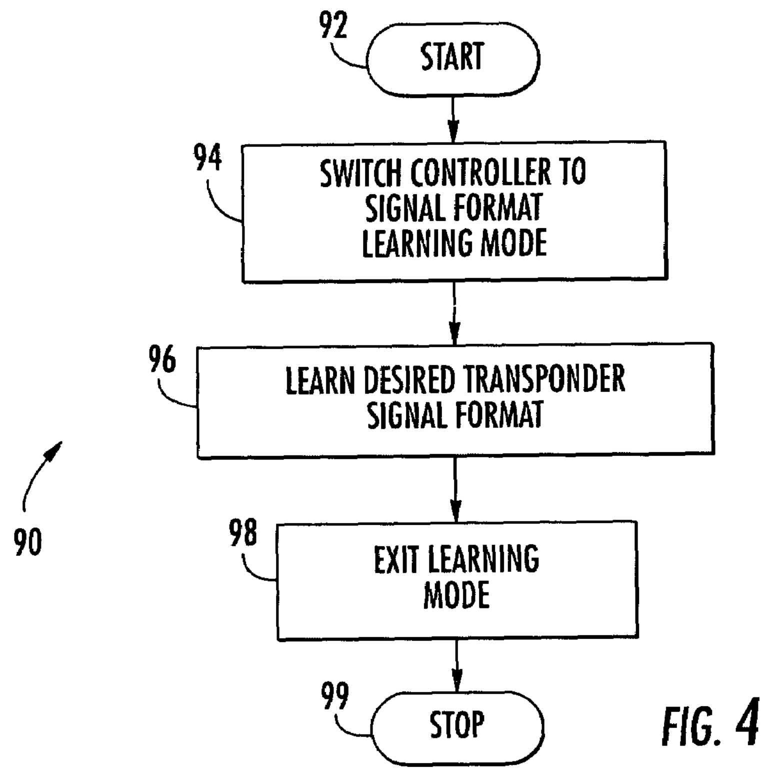
FIG. 4 is a flow chart illustrating operation of the vehicle remote start control system shown in FIG. 1 when in the learning mode for learning a desired transponder signal format.

Turning now additionally to the flow chart 90 of FIG. 4, another method of operation of the vehicle remote start control system 20 is now described. From the start (Block 92), the remote start controller 30 is switched to the signal format learning mode at Block 94. At Block 96, the remote start controller 30 learns the desired transponder signal format. At Block 98, the remote start controller 30 exits the learning mode before the method is completed at Block 99.

Figure 5:
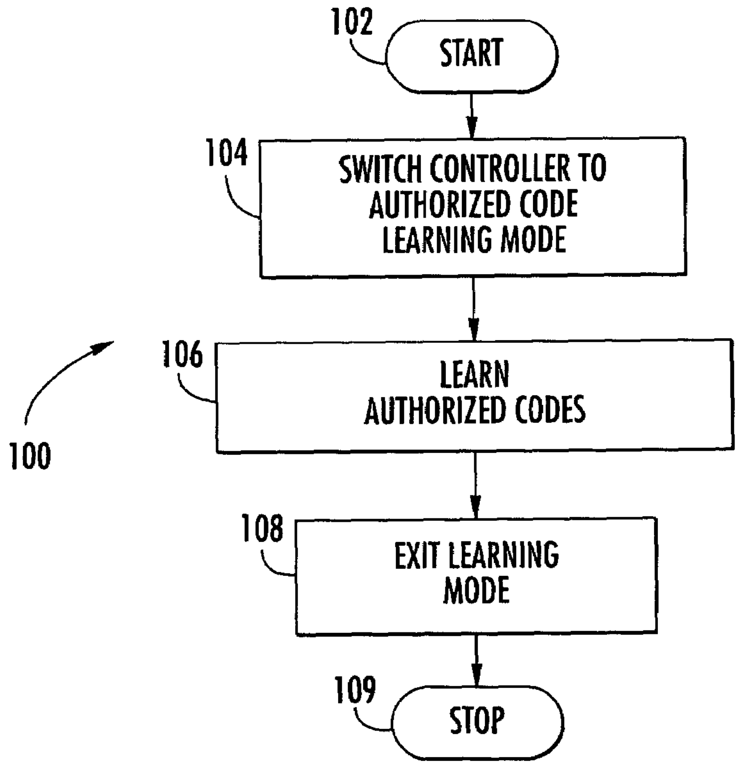
FIG. 5 is a flow charts illustrating operation of the vehicle remote start control system shown in FIG. 1 when in the learning mode for learning an authorized code.

Turning now additionally to the flow chart 100 of FIG. 5, yet another method of operation of the vehicle remote start control system 20 is now described. From the start (Block 102) the remote start controller 30 is switched to the authorized code learning mode at Block 104. At Block 106, the remote start controller 30 learns the authorized codes. At Block 108, the remote start controller 30 exits the learning mode before the method is completed at Block 109.

Those of skill in the art will readily recognize the benefits and advantages of the present invention for aftermarket security systems and other aftermarket systems for implementing remote control functions wherein compatibility with a potentially large number of different protocols and/or device addresses is desired. Of course, many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that the modifications and embodiments are intended to be included within the spirit and scope of the appended claims.

What is claimed is:

1. A vehicle remote start control system for a vehicle comprising a vehicle engine, an electrical system, and a transponder reader enabling the vehicle engine based upon wirelessly reading at least one authorized code from a transponder carried by a user and placed proximate the transponder reader, the vehicle remote start control system comprising:

a remote start transmitter; and a remote start controller at the vehicle and comprising a transponder code bypass transmitter electrically connected to the vehicle electrical system for wirelessly transmitting the at least one authorized code to the transponder reader responsive to the remote start transmitter to enable the vehicle engine.

2. A vehicle remote start control system according to claim 1 wherein the transponder reader comprises a transponder exciter for powering the transponder carried by the user; and wherein said transponder code bypass transmitter operates from the vehicle electrical system and independently of the transponder exciter.

3. A vehicle remote start control system according to claim 1 wherein said remote start controller turns off said transponder code bypass transmitter except when remote starting the vehicle engine.

4. A vehicle remote start control system according to claim 1 wherein said remote start controller comprises a multi-vehicle remote start controller compatible with a plurality of different transponder signal formats.

5. A vehicle remote start control system according to claim 4 wherein said remote start controller is switchable to a learning mode for learning a desired transponder signal format for a given transponder reader when in the learning mode.

6. A vehicle remote start control system according to claim 5 wherein said remote start controller comprises a downloading interface for receiving a desired transponder signal format for a given transponder reader when in the learning mode.

7. A vehicle remote start control system according to claim 5 wherein said remote start controller comprises at least one user operable switch for user input a desired transponder signal format for a given transponder reader when in the learning mode.

8. A vehicle remote start control system according to claim 1 wherein said remote start controller is switchable to a learning mode for learning the at least one authorized code.

9. A vehicle remote start control system according to claim 8 wherein said remote start controller learns a sequence of authorized codes for use with a changing code transponder reader.

10. A vehicle remote start control system according to claim 8 wherein said remote start controller comprises a downloading interface for receiving the at least one authorized code when in the learning mode.

11. A vehicle remote start control system according to claim 8 wherein said remote start controller comprises at least one user operable switch for user input of the at least one authorized code when in the learning mode.

12. A vehicle remote start control system according to claim 1 wherein said remote start controller repeats the at least one authorized code for at least one of a predetermined number of times and a predetermined time duration.

13. A vehicle remote start control system according to claim 1 wherein said remote start controller comprises a processor and a memory connected thereto.

14. A vehicle remote start control system according to claim 1 wherein the vehicle further comprises a data communications bus; and wherein said remote start controller further comprises a data bus interface for interfacing with the vehicle data communications bus.

15. A vehicle remote start control system according to claim 1 wherein said remote transmitter comprises a handheld remote transmitter to be carried by a user.

16. A vehicle remote start control system according to claim 1 wherein said remote transmitter comprises a central station transmitter.

17. A vehicle remote start control system for a vehicle comprising a vehicle engine, and a transponder reader enabling the vehicle engine based upon wirelessly reading an authorized code from a transponder carried by a user and placed proximate the transponder reader, the vehicle remote start control system comprising:

a remote start transmitter; and a remote start controller at the vehicle and comprising a transponder code bypass transmitter for wirelessly transmitting the authorized code to the transponder reader responsive to the remote start transmitter to enable the vehicle engine;

said remote start controller being switchable to a learning mode for learning at least one authorized code.

18. A vehicle remote start control system according to claim 17 wherein said remote start controller learns a sequence of authorized codes for use with a changing code transponder reader.

19. A vehicle remote start control system according to claim 17 wherein said remote start controller comprises a downloading interface for receiving the at least one authorized code when in the learning mode.

20. A vehicle remote start control system according to claim 17 wherein said remote start controller comprises at least one user operable switch for user input of the at least one authorized code when in the learning mode.

21. A vehicle remote start control system according to claim 17 wherein the vehicle comprises a vehicle electrical system; wherein the transponder reader comprises a transponder exciter for powering the transponder carried by the user; and wherein said transponder code bypass transmitter operates from the vehicle electrical system and independently of the transponder exciter.

22. A vehicle remote start control system according to claim 17 wherein said remote start controller turns off said transponder code bypass transmitter except when remote starting the vehicle engine.

23. A vehicle remote start control system according to claim 17 wherein said remote start controller comprises a multi-vehicle remote start controller compatible with a plurality of different transponder signal formats.

24. A vehicle remote start control system according to claim 17 wherein the vehicle further comprises a data communications bus; and wherein said remote start controller further comprises a data bus interface for interfacing with the vehicle data communications bus.

25. A vehicle remote start control system for a vehicle comprising a vehicle engine, and a transponder reader enabling the vehicle engine based upon wirelessly reading an authorized code from a transponder carried by a user and placed proximate the transponder reader, the vehicle remote start control system comprising:

a remote start transmitter; and a remote start controller at the vehicle and comprising a transponder code bypass transmitter for wirelessly transmitting the authorized code to the transponder reader responsive to the remote start transmitter to enable the vehicle engine;

said remote start controller being switchable to a learning mode for learning a desired transponder signal format for a given transponder reader from among a plurality of different transponder signal formats.

26. A vehicle remote start control system according to claim 25 wherein said remote start controller comprises a downloading interface for receiving a desired transponder signal format when in the learning mode.

27. A vehicle remote start control system according to claim 25 wherein said remote start controller comprises at least one user operable switch for user input of a desired transponder signal format when in the learning mode.

28. A vehicle remote start control system according to claim 25 wherein said remote start controller turns off said transponder code bypass transmitter except when remote starting the vehicle engine.

29. A vehicle remote start control system according to claim 25 wherein the vehicle comprises a vehicle electrical system; wherein the transponder reader comprises a transponder exciter for powering the transponder carried by the user; and wherein said transponder code bypass transmitter operates from the vehicle electrical system and independently of the transponder exciter.

30. A vehicle remote start control system according to claim 25 wherein the vehicle further comprises a data communications bus; and wherein said remote start controller further comprises a data bus interface for interfacing with the vehicle data communications bus.

31. A method for remotely starting a vehicle engine of a vehicle comprising an electrical system and a transponder reader enabling the vehicle engine based upon wirelessly reading at least one authorized code from a transponder carried by a user and placed proximate the transponder reader, the method comprising:

providing a remote start controller at the vehicle comprising a transponder code bypass transmitter electrically connected to the vehicle electrical system; and wirelessly transmitting the at least one authorized code from the transponder code bypass transmitter to the transponder reader responsive to the remote start transmitter to enable and start the vehicle engine.

32. A method according to claim 31 further comprising:

powering the transponder using a transponder exciter; and powering the transponder code bypass transmitter to operate from the vehicle electrical system and independently of the transponder exciter.

33. A method according to claim 31 further comprising turning off the transponder code bypass transmitter except when remote starting the vehicle engine.

34. A method according to claim 31 wherein the remote start controller comprises a multi-vehicle remote start controller compatible with a plurality of different transponder signal formats.

35. A method according to claim 34 further comprising switching the remote start controller to a learning mode for learning a desired transponder signal format for a given transponder reader when in the learning mode.

36. A method according to claim 34 further comprising downloading to the remote start controller a desired transponder signal format for a given transponder reader via a download interface on the remote start controller when in the learning mode.

37. A method according to claim 34 further comprising inputting into the remote start controller a desired transponder signal format for a given transponder reader using at least one user operable switch on the remote start controller when in the learning mode.

38. A method according to claim 31 further comprising switching the remote start controller to a learning mode for learning the at least one authorized code.

39. A method according to claim 38 wherein learning the at least one authorized code comprises learning a sequence of authorized codes for use with a changing code transponder reader.

40. A method according to claim 38 further comprising downloading the at least one authorized code to the remote start controller via a download interface on the remote start controller when in the learning mode.

41. A method according to claim 38 further comprising inputting into the remote start controller the at least one authorized code using at least one user operable switch on the remote start controller when in the learning mode.

42. A method according to claim 31 further comprising repeating the at least one authorized code for at least one of a predetermined number of times and a predetermined time duration.

43. A method according to claim 31 wherein the vehicle further comprises a data communications bus; and further comprising interfacing the remote start controller with the vehicle data communications bus.

* * * * *

UNITED STATES PATENT AND TRADEMARK OFFICE

CERTIFICATE OF CORRECTION

PATENT NO. : 7,091,822 B2
APPLICATION NO. : 10/452843
DATED : August 15, 2006
INVENTOR(S) : Flick et al.

It is certified that error appears in the above-identified patent and that said Letters Patent is hereby corrected as shown below:

| | |
|---|---|
| Column 3, Line 32 | Delete: “code to the from”<br>Insert: --code from-- |
| Column 3, Line 48 | Delete: “charts”<br>Insert: --chart-- |
| Column 4, Line 38 | Delete: “vehicle 12”<br>Insert: --vehicle 10-- |
| Column 6, Line 62 | Delete: “input a”<br>Insert: --input of a-- |

Signed and Sealed this

Third Day of April, 2007

JON W. DUDAS
*Director of the United States Patent and Trademark Office*